G. THIEL.
TALKING MACHINE.
APPLICATION FILED JAN. 5, 1911.
1,072,529.
Patented Sept. 9, 1913.
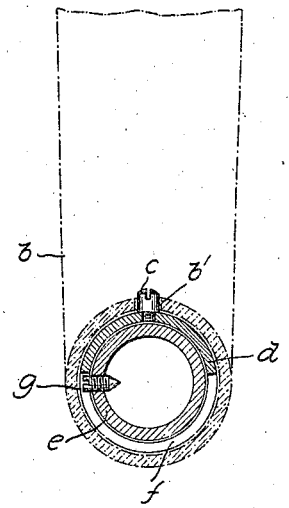
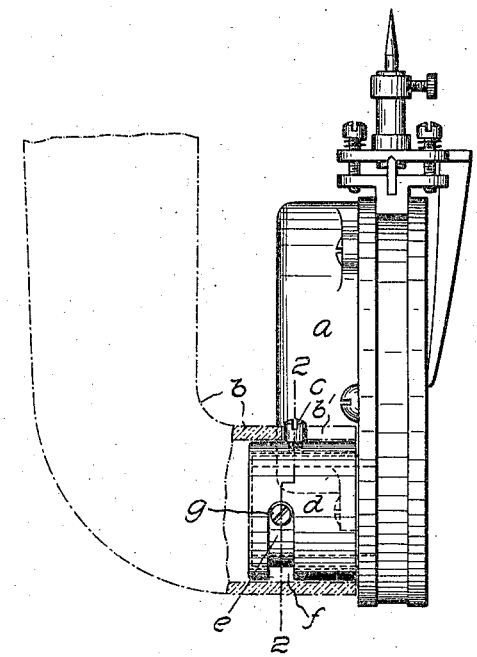
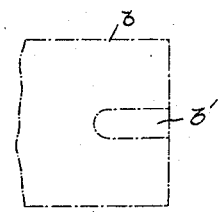
Witnesses:
Ernest A. Telfer
Carl L. Choate
Inventor:
Gustav Thiel
by Emery Booth Janney & Varney
Att'ys

UNITED STATES PATENT OFFICE.

GUSTAV THIEL, OF BERLIN, GERMANY.

TALKING-MACHINE.

1,072,529.  Specification of Letters Patent.  Patented Sept. 9, 1913.

Application filed January 5, 1911. Serial No. 600,365.

*To all whom it may concern:*

Be it known that I, GUSTAV THIEL, a subject of the German Emperor, and a resident of Tilsiterstrasse 67, Berlin, Germany, have invented a certain new and useful Improvement in or Relating to Talking-Machines; and I do hereby declare the following to be a full, clear, and exact description of the invention, such as will enable others skilled in the art to which it appertains to make and use the same, reference being had to the accompanying drawing, and to letters of reference marked thereon, which form a part of this specification.
This invention relates to talking machines.

The invention has particular reference to the connection of the sound box to the sound arm by eccentrically connecting the box to the sound arm.
Heretofore, in order to permit the sound box and needle to rise and fall to follow closely the record groove, it has been customary, for instance, to either pivotally connect the inner end of the sound arm to the horn, construct the sound arm of two lengths and pivotally connect one to the other longitudinally, or, in some similar manner, provide for vertical movement of the sound box and needle together with a portion of or the whole of the sound arm. It is well known that in talking machines, the interposition necessary in the common forms of construction, of loose joints, curves, or any other obstruction that breaks the desirable continuity of smooth surface of the sound arm between the sound box and the horn, injures the quality of the sound by breaking up the regular formation and transmission of the sound waves; such construction also diminishes the force of the sound waves. There is also another serious objection to the common forms of construction above referred to, and that is, the weight of the sound arm which is carried by the needle, causes the needle, as it travels over the record groove, to produce the disagreeable scratching sound which is so noticeable in machines of this construction. Consequently, it is desirable to effect a construction free, if possible, from the above defects, and I have succeeded in largely accomplishing this purpose by securing the sound box to the sound arm in such manner, as by eccentrically mounting it thereon, that it will rotate freely thereon, thus permitting the needle to rise and fall in response to any irregularities in the bottom of the sound groove, and also permitting the needle to adjust itself to any variation in the plane of rotation of the record. Owing to this arrangement, no separate link is required between the sound arm and the sound box or between two sections of the sound arm itself, or between the sound arm and the horn, thus providing a sound arm with a continuous smooth inner surface and therefore free from the objections above referred to. Owing to the eccentric mounting, the sound box, under the action of its own weight, will be pressed against the record disk. The construction is carried out in practice in such manner that a branch is mounted on the sound box and introduced into the sound arm, so that the sound box and branch can rotate on the sound arm. This construction is improved according to the present invention by arranging over the branch of the sound box a rotatable sleeve, for increasing the mobility of the sound box and for improving the tight joint for the sound. The said branch is provided with a pin guided in the slot of the sleeve. This sleeve is provided with a pin which is introduced into a slot of the sound arm.

In the accompanying drawing Figure 1 is a side elevation of the sound box with the sound arm in section, Fig. 2 is a section on the line 2.2, Fig. 1, through the sound arm and the branch of the sound box, and Fig. 3 is a plan of a portion of the sound arm with the slot.

The sound box is marked *a*, and the sound arm *b*. Over the branch *e* of the sound box is placed a sleeve *d* provided with a pin *c* by means of which it engages with the slot *b* of the sound arm. A pin *g* on the branch *e* of the sound box engages with a slot *f* of the sleeve *d*, so that the sound box and branch can freely rotate in the sleeve *d*.

What I claim is:

1. In a talking machine, the combination of a sound arm, an eccentrically positioned sound box therein having a neck, and a sleeve non-rotatably engaging said arm and rotatably engaging said neck.

2. In a talking machine, the combination of a sound box with an eccentrically disposed neck thereon provided with a sleeve engaging member, a sleeve freely rotatable on said neck and provided with a slot to receive said member, a sound arm engaging member on said sleeve and a sound arm slotted to receive said last named member and sleeve non-rotatably therein.

In testimony whereof I affix my signature in presence of two witnesses.

GUSTAV THIEL.

Witnesses:
   HENRY HASPER,
   WOLDEMAR HAUPT.